US012692872B2

(12) United States Patent
Spicer et al.

(10) Patent No.: US 12,692,872 B2
(45) Date of Patent: Jul. 28, 2026

(54) MAGNETIC DRIVE, SEAL-LESS PUMP

(71) Applicants: Wade Spicer, Northumberland, PA (US); Charles M. Woods, West Manchester, OH (US)

(72) Inventors: Wade Spicer, Northumberland, PA (US); Charles M. Woods, West Manchester, OH (US)

( * ) Notice: Subject to any disclaimer, the term of this patent is extended or adjusted under 35 U.S.C. 154(b) by 396 days.

(21) Appl. No.: 15/229,188

(22) Filed: Aug. 5, 2016

(65) Prior Publication Data

US 2017/0037854 A1 Feb. 9, 2017

Related U.S. Application Data

(60) Provisional application No. 62/201,367, filed on Aug. 5, 2015.

(51) Int. Cl.
*F04D 29/18* (2006.01)
*F04D 3/00* (2006.01)
(Continued)

(52) U.S. Cl.
CPC ............. *F04D 29/181* (2013.01); *F04D 3/00* (2013.01); *F04D 9/02* (2013.01); *F04D 13/024* (2013.01);
(Continued)

(58) Field of Classification Search
CPC .. F04D 29/181; F04D 29/185; F04D 13/0646; F04D 9/02; F04D 3/00–3/02; F04D 25/026; F04D 19/00–19/048; F04D 13/02–13/028; F04D 5/007; F04D 1/06; F04D 1/00; F04D 1/006; F04D 13/12; F04D 13/14; F04D 31/00; F04D 1/04; F04D 29/186; F04D 29/053; F04D 13/06;
(Continued)

(56) References Cited

U.S. PATENT DOCUMENTS 2,729,962 A 1/1956 Hicklin
2,827,856 A * 3/1958 Zozulin ................ F04D 13/026 417/420

(Continued)

FOREIGN PATENT DOCUMENTS

DE 19639223 3/1997
EP 0600821 A1 * 6/1994 ............ F04D 31/00

(Continued)

OTHER PUBLICATIONS

Machine Translation of EP 0600821 A1 to Geroges, retrieved from espacenet on Nov. 27, 2023 (Year: 2023).*

(Continued)

*Primary Examiner* — Essama Omgba
*Assistant Examiner* — Dnyanesh G Kasture
(74) *Attorney, Agent, or Firm* — Grogan, Tuccillo & Vanderleeden, LLP

(57) ABSTRACT

A magnetic drive, seal-less combination axial air and water pump includes a housing having an inlet and an outlet at least one impeller mounted for rotation within the housing, and a magnetic drive surrounding the first rotor and the second rotor, the magnetic drive being configured to transmit torque to the first rotor and a second rotor at a location radially spaced from a central axis of the first rotor and the second rotor.

17 Claims, 6 Drawing Sheets

(51) Int. Cl.
*F04D 9/02* (2006.01)
*F04D 13/02* (2006.01)
*F04D 13/06* (2006.01)

(52) U.S. Cl.
CPC ....... *F04D 13/0646* (2013.01); *F04D 29/185* (2013.01); *F05B 2210/13* (2013.01); *F05B 2240/14* (2013.01); *F05B 2240/30* (2013.01); *F05B 2250/36* (2013.01); *F05D 2210/13* (2013.01)

(58) Field of Classification Search
CPC .... F04D 13/0606; F04D 13/024; F04D 29/32; F04D 29/321; F04D 29/322; F04D 29/266; F04D 19/02; F05B 2250/36; F05B 2210/13; F05B 2240/14; F05B 2240/30; F05D 2210/13
See application file for complete search history.

(56) References Cited

U.S. PATENT DOCUMENTS

| | | | | | |
|---|---|---|---|---|---|
| 3,826,938 | A * | 7/1974 | Filer | H02K 49/06 | 310/104 |
| 3,938,914 | A * | 2/1976 | Zimmermann | F04D 13/026 | 417/420 |
| 4,874,975 | A * | 10/1989 | Hertrich | H02K 29/06 | 310/179 |
| 4,896,064 | A * | 1/1990 | Taiani | H02K 49/106 | 310/104 |
| 5,201,642 | A * | 4/1993 | Hinckley | F04D 13/026 | 415/115 |
| 5,211,546 | A | 5/1993 | Isaacson et al. | | |
| 5,289,068 | A * | 2/1994 | Veronesi | B63G 8/08 | 310/114 |
| 5,505,594 | A * | 4/1996 | Sheehan | F04D 13/02 | 415/72 |
| 5,527,159 | A * | 6/1996 | Bozeman, Jr. | A61M 1/10 | 415/900 |
| 5,596,238 | A * | 1/1997 | Milnikel | H02K 1/2786 | 310/104 |
| 5,818,131 | A | 10/1998 | Zhang | | |
| 5,857,842 | A * | 1/1999 | Sheehan | F04C 2/1073 | 417/203 |
| 6,369,477 | B1 * | 4/2002 | Bonin | H02K 41/06 | 310/156.01 |
| 6,595,743 | B1 | 7/2003 | Kazatchkov et al. | | |
| 7,238,066 | B2 * | 7/2007 | Taylor | F16C 17/06 | 114/151 |
| 7,707,878 | B2 * | 5/2010 | Kanayama | E21B 49/082 | 73/152.55 |
| 9,013,081 | B2 * | 4/2015 | Atallah | H02K 49/102 | 310/103 |
| 2001/0009645 | A1 | 7/2001 | Noda | | |
| 2003/0226641 | A1 * | 12/2003 | Collins | H01J 37/321 | 156/345.49 |
| 2004/0062654 | A1 * | 4/2004 | Chang | F04D 29/327 | 416/223 R |
| 2004/0197195 | A1 * | 10/2004 | Ogolla | F04D 13/12 | 417/89 |
| 2006/0043738 | A1 | 3/2006 | Roos | | |
| 2006/0257251 | A1 * | 11/2006 | Carlson | F04D 29/326 | 415/178 |
| 2007/0145751 | A1 * | 6/2007 | Roos | F03B 3/04 | 290/52 |
| 2008/0038126 | A1 * | 2/2008 | Berroth | F04D 13/14 | 417/420 |
| 2009/0094736 | A1 | 4/2009 | Booth et al. | | |
| 2009/0142207 | A1 | 6/2009 | Ring et al. | | |
| 2009/0200884 | A1 * | 8/2009 | Lafontaine | H02K 1/2791 | 310/156.25 |
| 2010/0028176 | A1 | 2/2010 | Platt | | |
| 2011/0012458 | A1 * | 1/2011 | Atallah | H02K 51/00 | 310/103 |
| 2011/0037333 | A1 | 2/2011 | Atallah et al. | | |
| 2011/0068546 | A1 * | 3/2011 | Hiestand | B23B 31/28 | 279/134 |
| 2012/0093668 | A1 * | 4/2012 | Gieras | B63H 23/24 | 417/420 |
| 2012/0094555 | A1 * | 4/2012 | Calverley | H02K 51/00 | 440/6 |
| 2013/0115833 | A1 * | 5/2013 | Suzuki | B63H 20/007 | 440/2 |
| 2015/0044027 | A1 * | 2/2015 | Van Dam | F04D 3/02 | 415/73 |
| 2016/0279311 | A1 * | 9/2016 | Cecere | F04D 29/181 | |
| 2017/0055760 | A1 * | 3/2017 | Burrows | F04B 43/02 | |
| 2021/0265905 | A1 * | 8/2021 | Jungmayr | H02K 49/102 | |
| 2021/0323527 | A1 * | 10/2021 | Nagel | B60T 13/746 | |

FOREIGN PATENT DOCUMENTS

| | | | | |
|---|---|---|---|---|
| EP | 0856665 | A2 | 8/1998 | |
| WO | 20050061902 | A1 | 7/2005 | |
| WO | WO 2012001025 | A2 * | 1/2012 | F02N 15/065 |

OTHER PUBLICATIONS

Internation Search Report and Written Opinion Dated Oct. 26, 2016 From Corresponding PCT Application No. PCT/2016/045711.
Supplementary European Search Report dated Feb. 27, 2019 from corresponding PCT Application No. PCT/US2016045711.
Decision of Rejection as issued in corresponding Chinese Patent Application No. 201680054312.8 dated Apr. 6, 2021.
European Search Report dated Oct. 11, 2022 from corresponding European Application No. 22187796.2.
European Search Report dated Augsut 8, 2024 from corresponding European Application No. 22 187 796.2-1004.

* cited by examiner

MAGNETIC DRIVE, SEAL-LESS PUMP

CROSS-REFERENCE TO RELATED APPLICATIONS

This application claims the benefit of U.S. Provisional Application Ser. No. 62/201,367, filed on Aug. 5, 2015, which is herein incorporated by reference in its entirety.

FIELD OF THE INVENTION

The present invention relates generally to pumps and, more particularly, to a magnetic drive, seal-less, axial air and water pump.

BACKGROUND OF THE INVENTION

Typical water pumps incorporate what is referred to as a "wet end" with an electric motor to produce water flow. The wet end consists of a centrifugal rotor contained within a plastic housing that diverts the water away from the rotor as it pumps outward from a linear feed flow to a centrifugal flow. The rotor is generally attached to the shaft of the motor, and the shaft is isolated from contact with the water within the pump by a compression wear seal that both seals the water inside the pump from leaking out of the pump, and provides a barrier to the water from reaching the shaft of the motor. In existing swimming pool and spa pump, the integrity of this seal may be compromised, requiring replacement or maintenance. Even if the seal does not fail outright and cause significant leakage through the seal, small leaks can form at the dynamic compression interface which, in turn, allows water to run down the shaft of the motor to the motor bearings. This can cause corrosion, which may be enhanced by the pool or spa chemicals, which can lead to motor failure. This type of leakage costs the pool and spa industries a lot of money in warranty service calls and pump replacements.

Attempts have been made to eliminate these seals by attaching magnets to the shaft of the motor, and attaching magnets to the inside of a hollow shaft attached to the rotor. A sealed housing is placed between the two magnets, and the magnetic coupling between the two magnets cause the rotor to turn and pump water when the motor is activated. There are several issues with this type of design, however. For example, the pump is still a less efficient centrifugal type rotor arrangement, which requires significant torque to drive it effectively. Moreover, the surface area necessary for the magnetic coupling to turn the rotor is limited by the relatively small motor shaft diameters and the limits of how big the internal housing arrangement can be made to couple to the rotor. Ultimately, such design results in low transmitted torque values and, accordingly, underperformance in that they do not pump enough water nor produce enough pressure.

Further solutions have involved the use of bigger motors, shafts and housings, the cost of which is typically too much to make them competitive with smaller, more powerful direct drive pumps with compression seals.

In view of the above, there is a need for a seal-less water pump that rivals existing direct drive, seal-containing pumps in terms of performance and cost.

SUMMARY OF THE INVENTION

It is an object of the present invention to provide a pump.

It is another object of the present invention to provide a magnetic drive, seal-less, axial air and water pump.

It is another object of the present invention to provide a magnetic drive, seal-less, axial air and water pump that rivals existing direct drive, seal-containing pumps in terms of performance and cost.

These and other objects are achieved by the present invention.

In an embodiment, a magnetic drive, seal-less combination axial air and water pump includes a housing having an inlet and an outlet at least one impeller mounted for rotation within the housing, and a magnetic drive surrounding the first rotor and the second rotor, the magnetic drive being configured to transmit torque to the first rotor and a second rotor at a location radially spaced from a central axis of the first rotor and the second rotor.

In another embodiment, a method of pumping a fluid includes the steps of arranging at least one rotor interior to a pump housing, surrounding the at least one rotor with a magnetic drive assembly, the magnetic drive assembly including a generally cylindrical inner array of magnets encompassing the at least one rotor and a generally cylindrical outer array of magnets surrounding the inner array, coupling an inlet of the housing to a source of fluid, and transmitting torque to the at least one rotor at a location radially spaced from a longitudinal axis of the at least one rotor.

In yet another embodiment, a magnetic drive, seal-less, axial pump includes a generally cylindrical housing having an inlet and an outlet, at least one impeller mounted for rotation within the housing, and a magnetic drive surrounding the first rotor and the second rotor, the magnetic drive being configured to transmit torque to an outer portion of the at least impeller at a location spaced radially from a longitudinal axis of the housing for rotating the impeller. The magnetic drive includes an inner magnetic array positioned interior to the housing and a outer magnetic array positioned exterior to the wall of the housing.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENT

Figure 1:
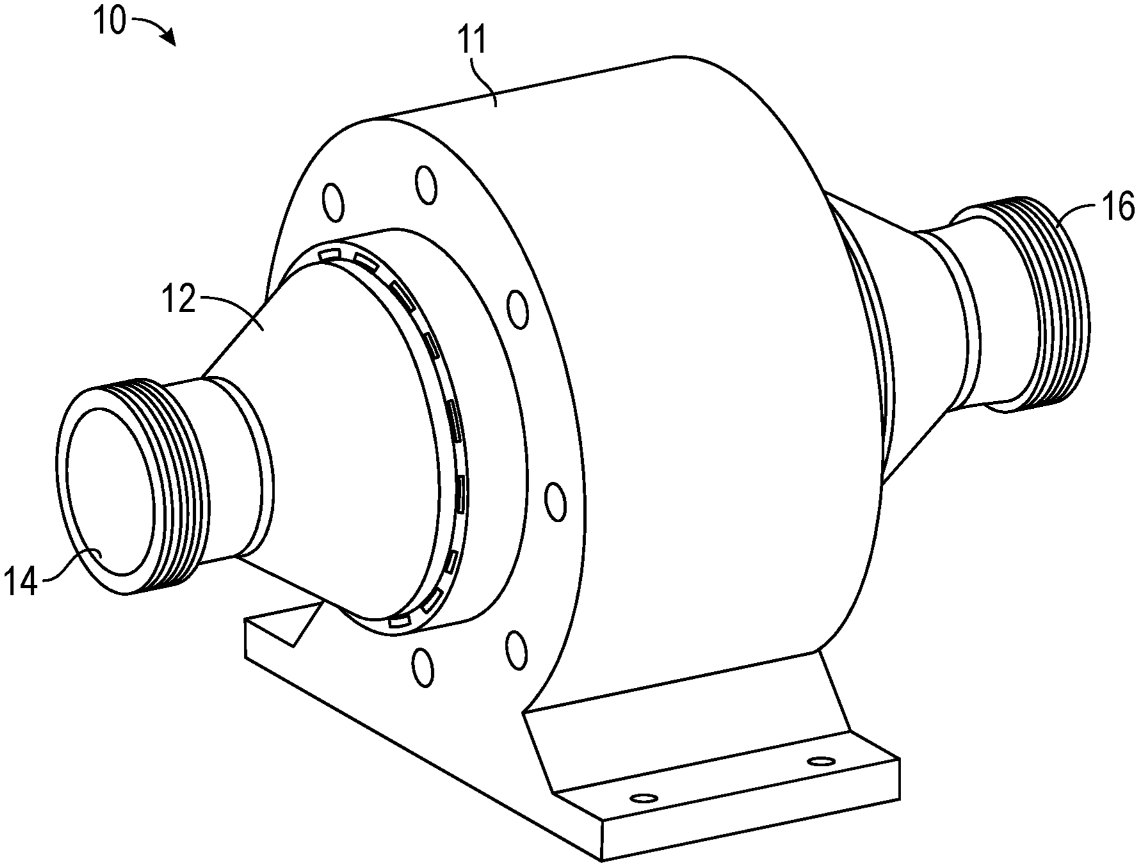
FIG. 1 is a perspective view of a pump according to an embodiment of the present invention.
Figure 2:
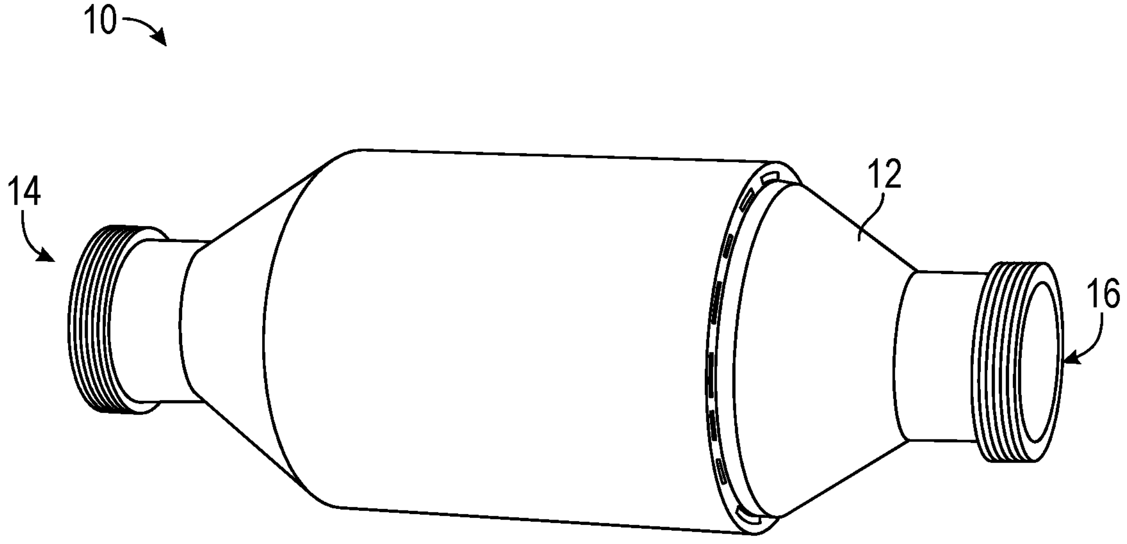
FIG. 2 is a perspective view of a housing of the pump of FIG. 1.
Figure 3:
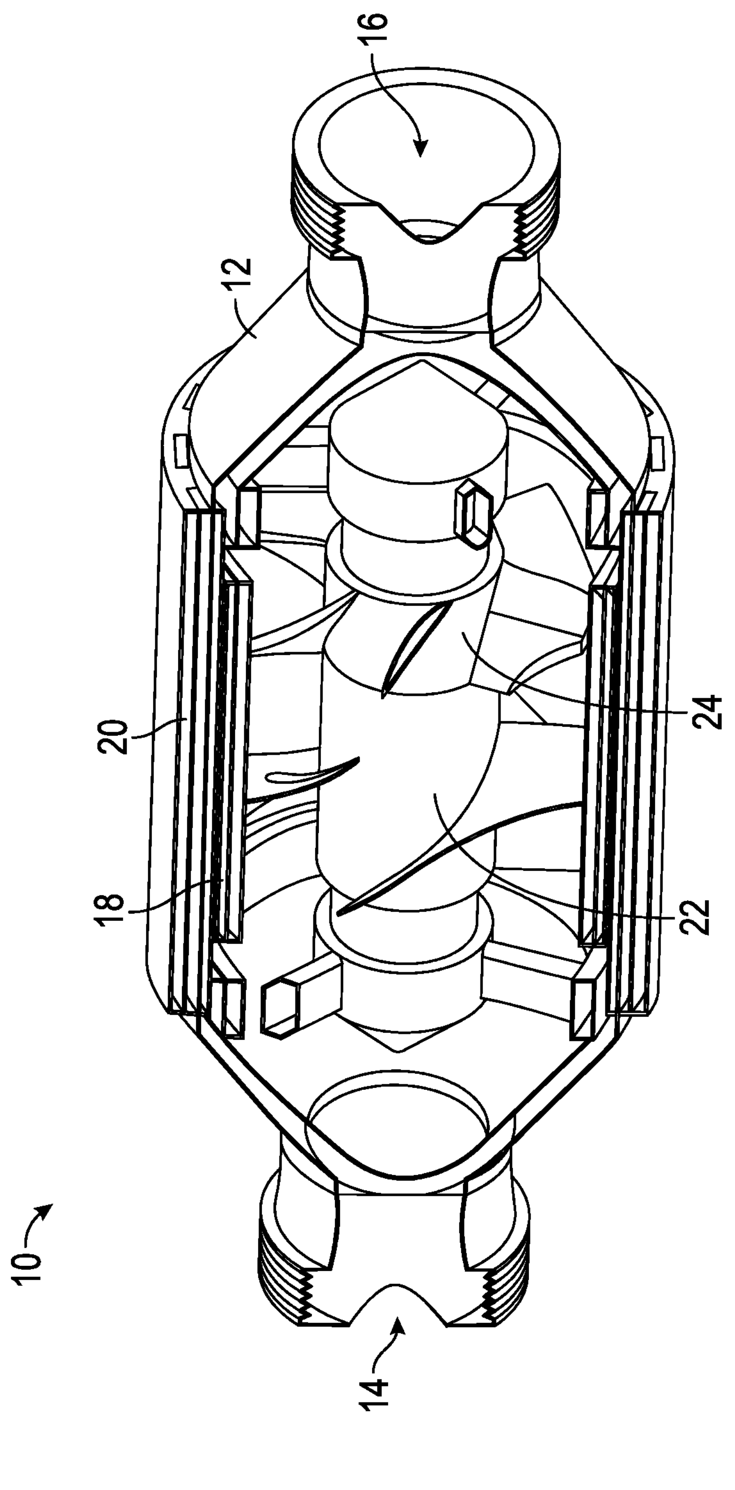
FIG. 3 is a longitudinal, cross-sectional view of the pump of FIG. 1.
Figure 4:
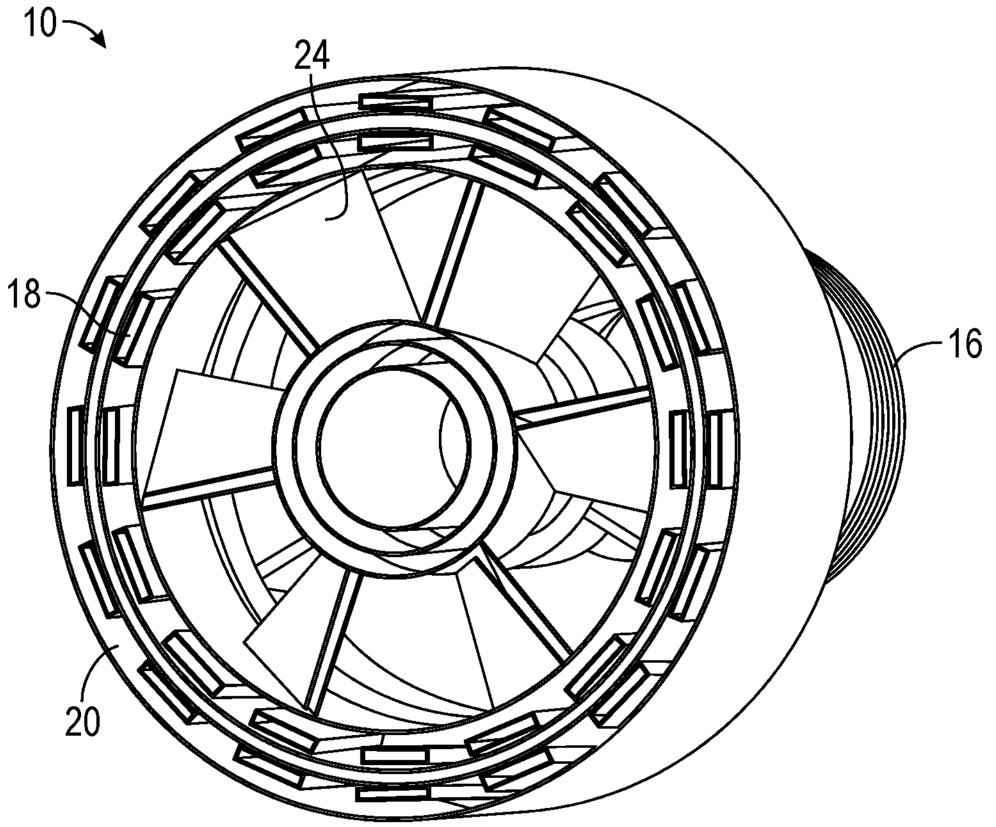
FIG. 4 is an axial, cross-sectional view of the pump of FIG. 1, showing an air rotor thereof.
Figure 5:
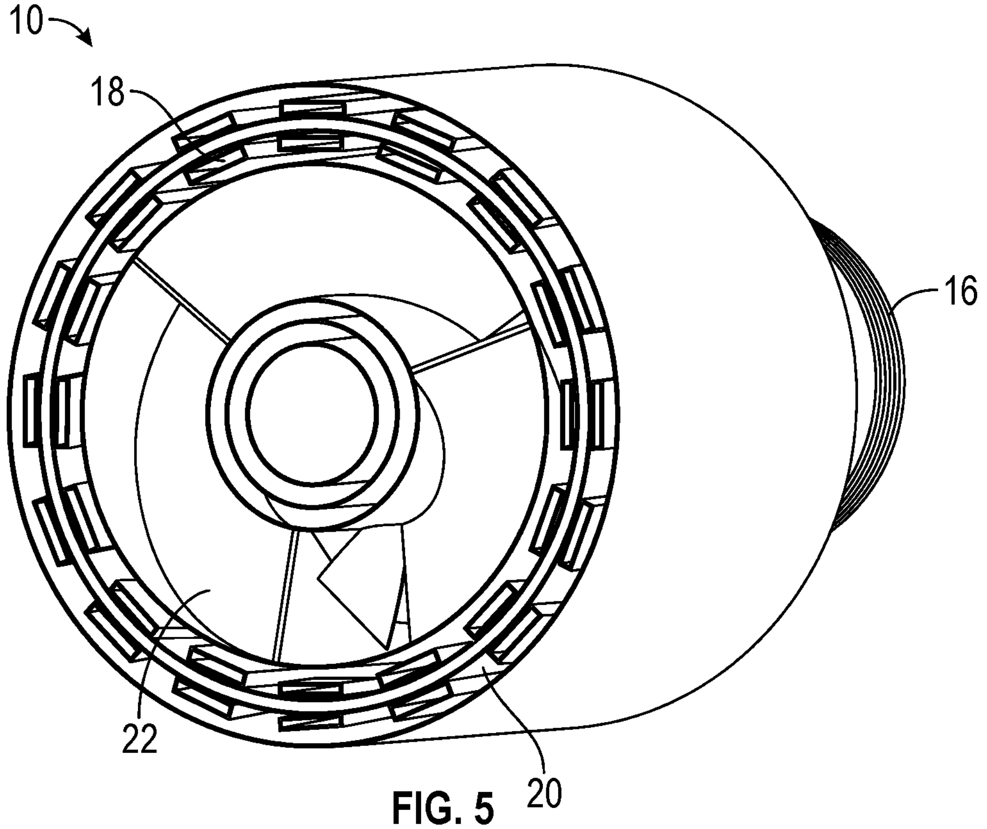
FIG. 5 is another axial, cross-sectional view of the pump of FIG. 1, showing a water rotor thereof.
Figure 6:
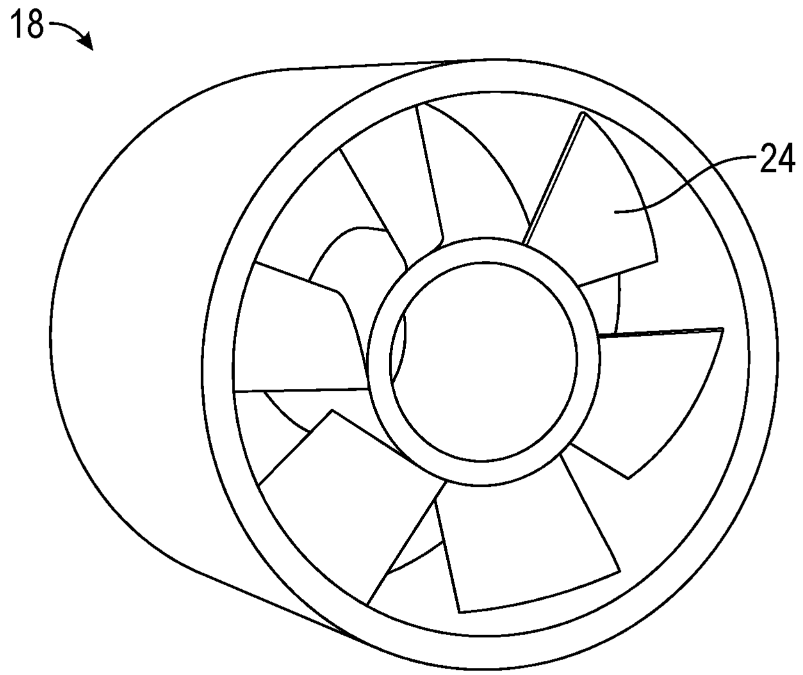
FIG. 6 is an axial, cross-sectional view showing an inner magnetic array of the pump of FIG. 1.

Referring to FIGS. 1-3, the present invention relates to a magnetic drive, seal-less combination axial air and water pump 10. As shown therein, the pump 10 includes a housing 12 having an inlet 14 for accepting a linear flow of a fluid therethrough, and an outlet 16 for discharging the fluid at high pressure. The housing 12 is integrated with an external magnetic drive mechanism that includes an inner magnetic array 18 positioned within the housing and having a plurality of magnets, and an outer magnetic array 20 positioned outside the housing and surrounding the housing and having a plurality of magnets. As shown therein, the inner and outer magnetic array 18, 20 may be of a substantially cylindrical shape and dimensioned to correspond to the length, shape and diameter of the housing 12. In particular, in an embodiment, the inner magnetic array 18 is generally cylindrical in shape, has an outside diameter that corresponds closely to the inner diameter of the housing, and has a length that corresponds to the approximate length of the pump housing. Likewise, the outer magnetic array 20 is generally cylindrical in shape, has an inside diameter that corresponds closely to the outside diameter of the housing, and has a length that corresponds to the approximate length of the pump housing. As shown in FIG. 1 the pump 10 is coupled to and surrounded by a hollow core motor 11 of any type known in the art, which is configured to drive the magnetic drive.

As best illustrated in FIG. 3, a plurality of impellers or turbines, referred to herein as a water rotor 22 and an air rotor 24, are mounted for rotation within the housing 12, interior to the inner magnetic array 18. In the preferred embodiment, the air rotor 24 is positioned within the housing 12 generally adjacent the outlet 16 while the water rotor 22 is positioned within the housing 12 axially closer to the inlet 14 than the air rotor 24.

Figure 8:
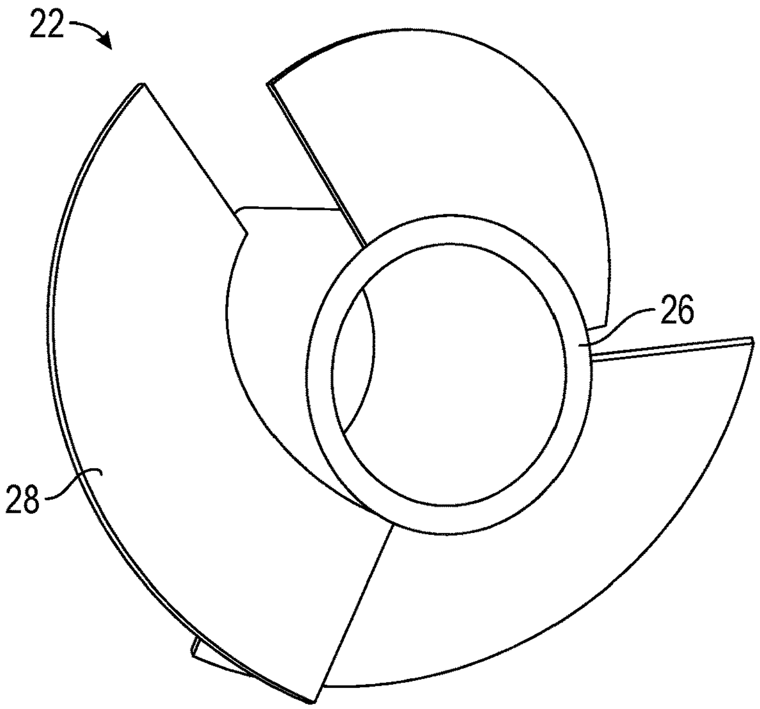
FIG. 8 is a detail perspective view of the water rotor of the combination air and water rotor of FIG. 7.
Figure 9:
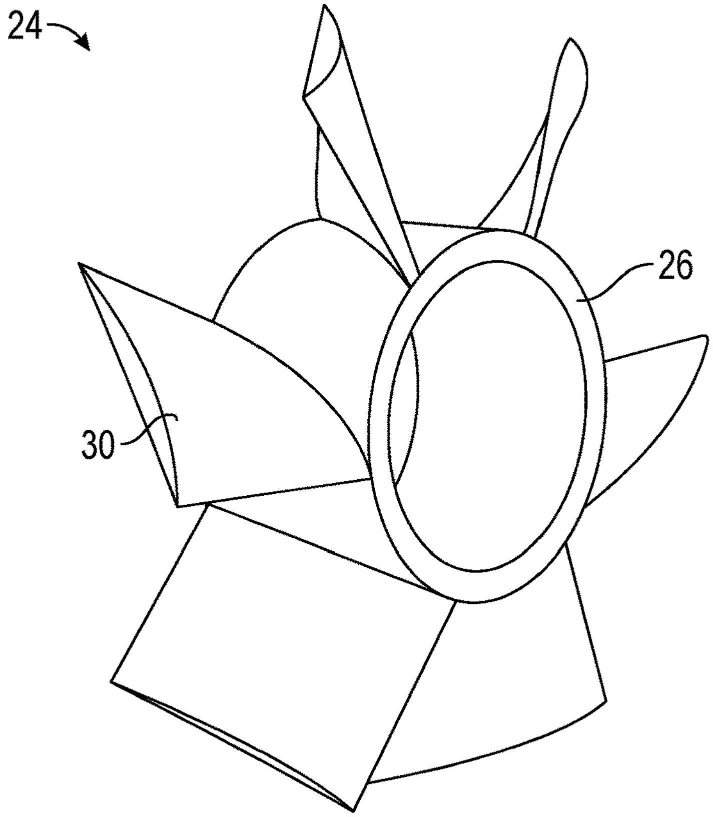
FIG. 9 is a detail perspective view of the air rotor of the combination air and water rotor of FIG. 7.

FIGS. 8 and 9 illustrate the configuration of the water rotor 22 and the air rotor 24, respectively. As shown therein, each rotor 22, 24 has a generally hollow, cylindrical shaft 26 on which a plurality of blades are carried. As shown therein, the water rotor 22 has three blades 28 mounted to the shaft 26 while the air rotor has six blades 30 mounted to the shaft 26. The blades 28 of the water rotor 22 each take up a greater portion of the circumference of the shaft than do the blades 30 of the air rotor 24.

In operation, the external magnetic drive mechanism that surrounds the rotors transmits torque to the outside of the rotors, rather than to the center-line shaft of the rotor, thus allowing for the generation of much higher transmitted torques than has heretofore been possible. This arrangement of the magnets in an external array allows for the placement of many more coupling magnets about an order of magnitude more coupling area than can be achieved by the prior art. This increase in coupling area results in significantly more torque transmitted to the rotors and allows for higher outputs and more pressure for the pump.

Although this external coupling mechanism can be utilized to power standard centrifugal pumps, it allows for much a more efficient straight through linear pump design such as that described herein. Using a hollow core electric motor to power the external magnetic coupling mechanism allows for the provision of a straight-through linear pumping system. The pump 10 of the present invention is much more energy efficient than centrifugal pumps and needs far less toque to run it efficiently. This fact, coupled with the enhanced torque produced by the external magnetic coupling mechanism, allows the pump of the present invention to far outperform any magnet-driven pumps of similar size.

In addition to the above, the pump 10 of the present invention allows for a completely seal-less pumping system for use in swimming pools, spas, and other applications where seal leakage can lead to failure of the pumps. Because the pump is linear, multiple rotors can be easily incorporated into the design to produce higher and more efficient outputs. In addition to multiple rotors for pumping water, turbo rotors for pumping air can also be incorporated to form a very efficient air pump. Moreover, in addition to air and water pumps, multiple mixed rotors can be added to the same shaft so that the linear pump is capable of pumping either water or air, or a combination of both.

Figure 7:
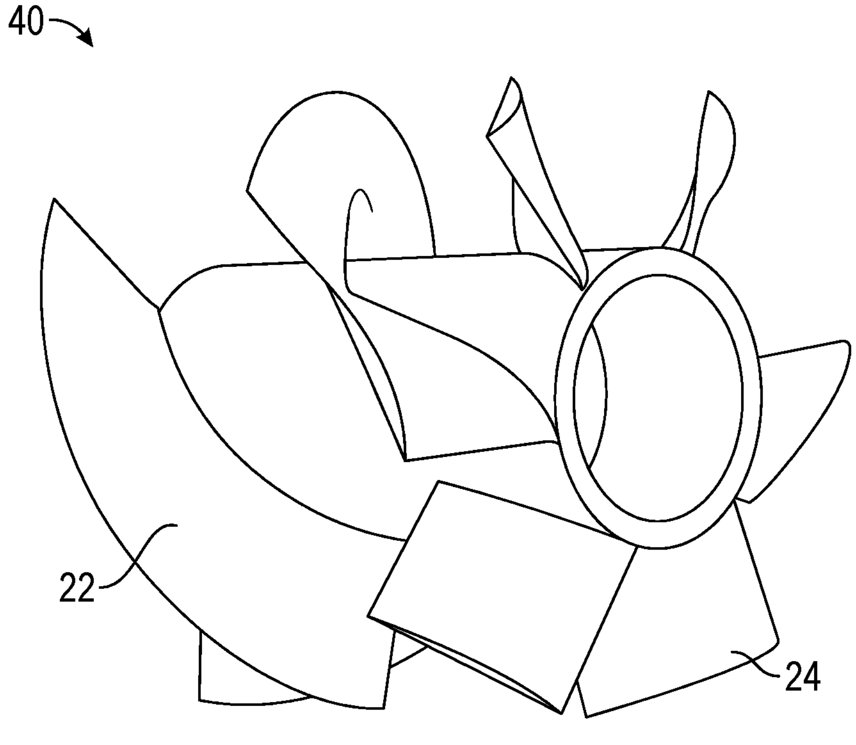
FIG. 7 is a perspective view of a combination air and water rotor of the pump of FIG. 1.

For example, in an embodiment, a combination rotor 40 having a water rotor 22 and an air rotor 24 may be utilized within the pump 10 for pumping both air and water, as illustrated in FIG. 7. This is useful, for example, for inflatable spas where one pump can be used to inflate the spa and then pump the water for that spa with the same pump. Additional air inlets can be opened to allow air into the pump where the combination of rotors will pump and mix the air and water to form aerated water for the spa jets. This capability will allow for the elimination of a separate blower unit for spas.

Figure 10:
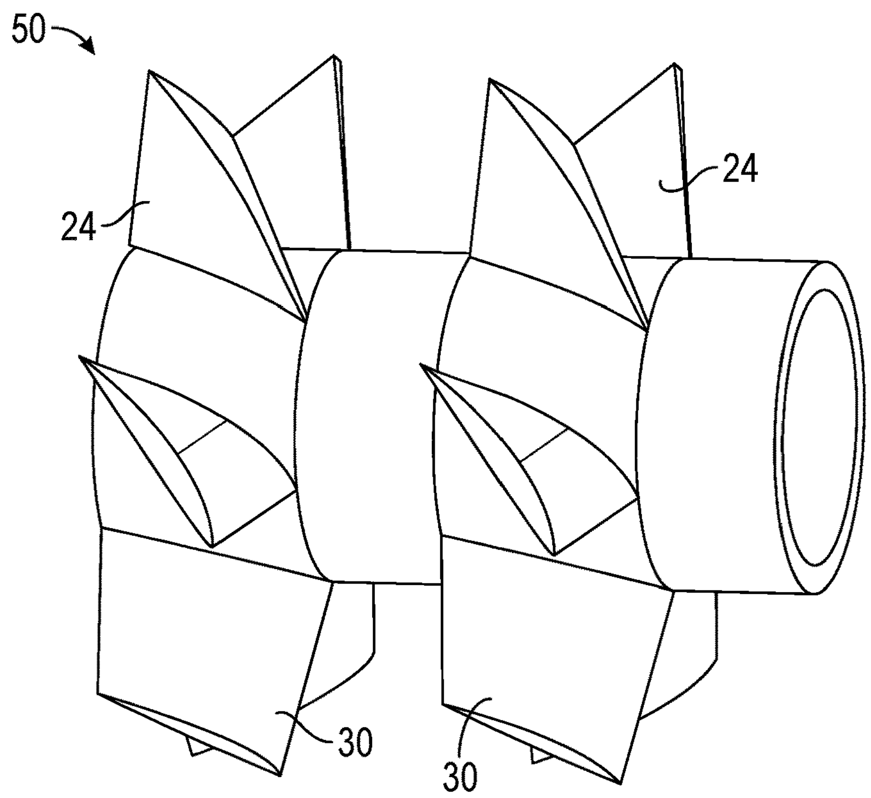
FIG. 10 is a perspective view of a double air rotor, according to an embodiment of the present invention.
Figure 11:
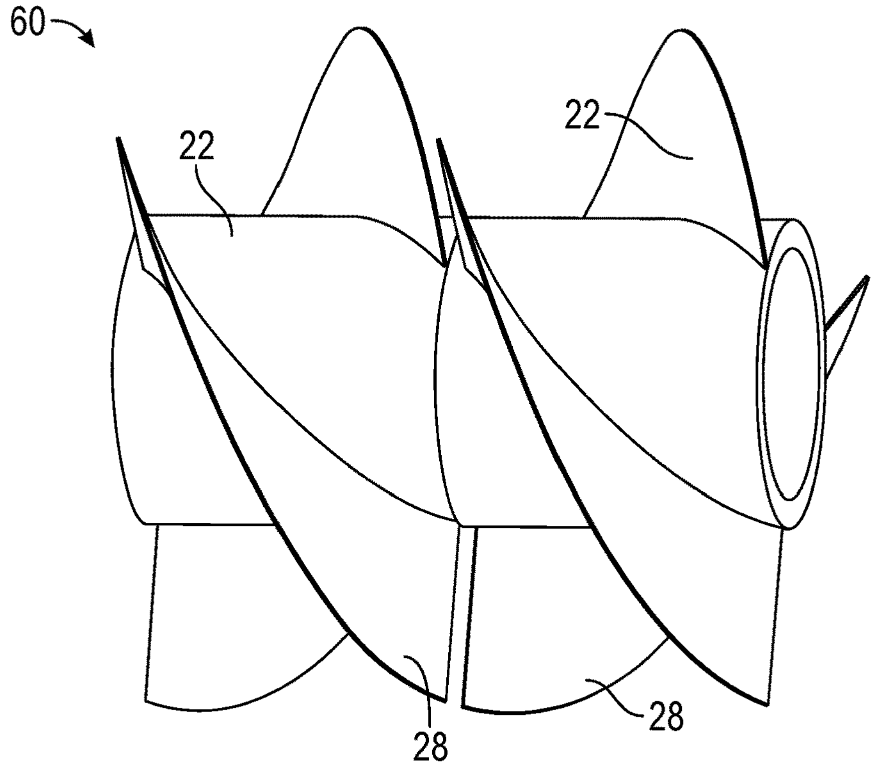
FIG. 11 is a perspective view of a double water rotor according to an embodiment of the present invention.

Alternatively, a double air rotor 50 having dual air rotors 24, as shown in FIG. 10, may be utilized for pumping just air, while a double water rotor 60 having dual water rotors 22, as shown in FIG. 11, may be utilized for pumping just water.

As indicated above, the present invention therefore allows for the production of a high torque, magnetic drive unit for swimming pool and spa pumps. The linear drive, linear flow-through pump of the present invention is capable of pumping both air and water, or a combination of the two, which provides a level of versatility heretofore not seen in the art. As discussed above, this obviates the need to utilize two separate pumps for air and water. Moreover, the pump, when coupled with a hollow core electric motor, provides a compact and simplified pumping system that is energy efficient, easily scalable to higher outputs, and can be used to pump both liquid and air.

As further discussed above, the pump 10 of the present invention does not utilize seals, which allows it to be used not only for the pumping of water and air over a very long life, but also for other applications such as the pumping of corrosive liquids of any kind. Indeed, while the present invention has been described herein as being utilized to pump air and water, the present invention is not intended to be limited in this regard. In particular, because there are no seals, the pump may be utilized to pump any fluid, including corrosive liquids. In stainless steel configurations, the pump 10 may be utilized as an emulsifying pumping system for the food and chemical industries.

It is also contemplated that the pump may be manufactured in a variety of geometries to suit any specific application, such as long and skinny, short and wide, etc.

In yet another embodiment, the pump 10 may utilize the magnetic stator of an induction motor to produce the rotating magnetic driving field like that in an induction motor. In particular, in an embodiment this rotating field is coupled to rotating magnets similar to the inner and outer magnetic arrays described above that provide the poles driven by the stator. This spins the rotors within the pump housing just as if it were a motor winding, but it is all sealed in the housing, as discussed above.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A magnetic drive, seal-less pump, comprising:

a housing having an inlet and an outlet;

at least one impeller mounted for rotation within the housing, the at least one impeller including a common hollow shaft and a plurality of blades disposed axially along the common hollow shaft between the inlet and the outlet of the housing, with each of the blades extending radially outward from the common hollow shaft; and a magnetic drive having an inner magnet array interior to the housing and coupled to the at least one impeller at distal ends of the plurality of blades of the at least one impeller, such that the inner magnet array circumscribes the at least one impeller and the plurality of blades thereof, the inner magnet array being radially spaced from a central axis of the at least one impeller, and an outer magnet array positioned outside of the housing and surrounding the housing;

wherein the inner magnet array includes a plurality of magnets arranged in an annular configuration, wherein each magnet of the plurality of magnets is linear and extends parallel to the central axis and the inner magnet array is cylindrical in shape and has an outside diameter that corresponds to an inner diameter of the housing;

wherein the housing and the magnetic drive are configured for insertion into a hollow core stator of an electric motor configured to power the magnetic drive;

wherein the hollow core stator includes a first axial end and a second axial end opposing the first axial end, the first axial end and the second axial end each having an opening therethrough into an interior of the hollow core stator, the opening into the interior of the hollow core stator extending from the first axial end to the second axial end;

wherein a portion of the housing including blades disposed on the common hollow shaft nearest to the inlet and the outlet and a portion of the magnetic drive including the outer magnet array extend toward the first axial end and the second axial end of the hollow core stator;

wherein the magnetic drive is configured to transmit torque to the at least one impeller at an outside of the at least one impeller, rather than through the common hollow shaft;

wherein the magnetic drive is configured to transmit torque to the at least one impeller at a location radially spaced from the central axis of the at least one impeller, wherein the magnetic drive is configured to transmit torque to all of the plurality of blades extending radially outward from the common hollow shaft including the blades disposed on the common hollow shaft nearest to the inlet and the outlet of the housing;

wherein the outer magnet array forms an outer casing of the pump, which is directly received within the hollow core stator of the electric motor, the outer magnet array is cylindrical in shape and has an inside diameter that corresponds to an outer diameter of the housing;

wherein the common hollow shaft of the at least one impeller is hollow such that no component of the pump intersects the central axis about which the at least one impeller rotates, the common hollow shaft being supported by the blades of the impeller; and wherein the at least one impeller includes a first impeller having a first rotatable, hollow shaft portion from which a plurality of blades extend and a second impeller having a second rotatable, hollow shaft portion from which a plurality of blades extend, the first and second hollow shaft portions together forming the common hollow shaft, the second impeller taking up a greater portion of a circumference of the common hollow shaft than the first impeller.

2. The pump of claim 1, wherein:

wherein an axial end of the first rotatable, hollow shaft portion of the first impeller is coupled to an axial end of the second rotatable, hollow shaft portion of the second impeller to form the common hollow shaft that is not configured to transmit torque from the magnetic drive extending between the inlet and the outlet of the housing;

wherein the first impeller is a water impeller configured to pump water; and wherein the second impeller is an air impeller configured to pump air.

3. The pump of claim 2, wherein:

the water impeller includes three blades and is positioned adjacent to the inlet; and the air impeller include six blades and is positioned adjacent to the outlet.

4. The pump of claim 1, wherein:

the housing is selectively removeable from the hollow core stator of the electric motor.

5. The pump of claim 1, wherein:

the hollow core stator of the electric motor is an induction motor with a stator, the stator configured to produce a rotating magnetic driving field configured to couple to the outer magnetic array.

6. The pump of claim 1, wherein:

the housing contains a gas inlet.

7. The pump of claim 6, wherein:

in a first state the gas inlet remains closed and only liquid is pumped;

in a second state the gas inlet is opened and only gas is pumped; and in a third state both gas and liquid may be pumped.

8. The pump of claim 1, wherein:

the pump is devoid of seals within the housing.

9. The pump of claim 1, wherein:

the outer magnet array is coextensive with the inner magnet array in an axial direction of pump.

10. The pump of claim 1, wherein:

the plurality of magnets includes more than four magnets.

11. The pump of claim 1, wherein:

the plurality of magnets, combined, occupy a circumferential extent that is greater than a circumference of a circle circumscribing the plurality of blades.

12. The pump of claim 1, wherein the portion of the housing that extends out beyond the periphery of both the first axial end and the second axial end of the hollow core stator includes the inlet and the outlet, wherein the inlet of the housing extends out beyond the periphery of the first axial end of the hollow core stator and the outlet of the housing extends out beyond the periphery of the second axial end of the hollow core stator.

13. A magnetic drive, seal-less, axial pump, comprising:

a cylindrical housing having an inlet and an outlet;

at least one impeller mounted for rotation within the housing about a central axis of the at least one impeller, wherein the at least one impeller includes a common hollow shaft and a plurality of blades disposed axially along the common hollow shaft between the inlet and the outlet of the housing, with each of the blades extending radially outward from the common hollow shaft;

a magnetic drive having an inner magnet array interior to the housing and coupled to the at least one impeller at an outermost radial extent of the at least one impeller such that the inner magnet array circumscribes the at least one impeller, and an outer magnetic array positioned exterior to the housing and the inner magnet array;

wherein the inner magnet array includes a plurality of magnets arranged in an annular configuration, wherein each magnet of the plurality of magnets is linear and extends parallel to the central axis and the inner magnet array is cylindrical in shape and has an outside diameter that corresponds to an inner diameter of the housing;

wherein the housing and the magnetic drive are configured for insertion into a hollow core stator of an electric motor configured to power the magnetic drive;

wherein the hollow core stator includes a first axial end and a second axial end opposing the first axial end, the first axial end and the second axial end each having an opening therethrough into an interior of the hollow core stator, the opening into the interior of the hollow core stator extending from the first axial end to the second axial end;

wherein a portion of the housing including blades disposed on the common hollow shaft nearest to the inlet and the outlet and a portion of the magnetic drive including the outer magnet array extends toward the first axial end and the second axial end of the hollow core stator;

wherein the magnetic drive is configured to transmit torque to the at least one impeller at an outside of the at least one impeller, rather than through the common hollow shaft;

wherein the magnetic drive is configured to transmit, via the inner and outer magnetic array, torque to the at least one impeller at a location radially spaced from the central axis of the at least one impeller, wherein the magnetic drive is configured to transmit torque to all of the plurality of blades extending radially outward from the common hollow shaft including the blades disposed on the common hollow shaft nearest to the inlet and the outlet of the housing;

wherein the outer magnetic array forms an outer casing of the pump, which is directly received within the hollow core stator of the electric motor, the outer magnet array is cylindrical in shape and has an inside diameter that corresponds to an outer diameter of the housing;

wherein the pump is devoid of any seals interior to the housing;

wherein the common hollow shaft is hollow such that no component of the pump intersects the central axis about which the at least one impeller rotates and the common hollow shaft is supported by the blades of the impeller;

wherein the plurality of magnets includes more than four magnets which, combined, occupy a circumferential extent that is greater than a circumference of a circle circumscribing the plurality of blades; and wherein the at least one impeller includes a first impeller having a first rotatable, hollow shaft portion from which a plurality of blades extend and a second impeller having a second rotatable, hollow shaft portion from which a plurality of blades extend, the first and second hollow shaft portions together forming the common hollow shaft, the second impeller taking up a greater portion of a circumference of the common hollow shaft than the first impeller.

14. The pump of claim 13, wherein:

wherein an axial end of the first rotatable, hollow shaft portion of the first impeller is coupled to an axial end of the second rotatable, hollow shaft portion of the second impeller to form the common hollow shaft that is not configured to transmit torque from the magnetic drive extending between the inlet and the outlet of the housing;

wherein the first impeller is a water impeller configured to pump water; and wherein the second impeller is an air impeller configured to pump air.

15. The pump of claim 13, wherein the portion of the housing that extends out beyond the periphery of both the first axial end and the second axial end of the hollow core stator includes the inlet and the outlet, wherein the inlet of the housing extends out beyond the periphery of the first axial end of the hollow core stator and the outlet of the housing extends out beyond the periphery of the second axial end of the hollow core stator.

16. A pump, comprising:

a housing having an inlet and an outlet;

at least one impeller mounted for rotation within the housing, the at least one impeller including a common hollow shaft and a plurality of blades disposed axially along the common hollow shaft between the inlet and the outlet of the housing, with each of the blades extending radially outward from the common hollow shaft; and a magnetic drive having an inner magnet array interior to the housing and coupled to the at least one impeller at distal ends of the plurality of blades of the at least one impeller, such that the inner magnet array circumscribes the at least one impeller and the plurality of blades thereof, the inner magnet array being radially spaced from a central axis of the at least one impeller, and an outer magnet array positioned outside of the housing and surrounding a portion of the housing that encloses the at least one impeller and the common hollow shaft therein;

wherein the inner magnet array includes a plurality of magnets arranged in an annular configuration, wherein each magnet of the plurality of magnets is linear and extends parallel to the central axis and the inner magnet array is cylindrical in shape and has an outside diameter that corresponds to an inner diameter of the housing;

wherein the housing and the magnetic drive are configured for insertion into a hollow core stator of an electric motor configured to power the magnetic drive;

wherein the hollow core stator includes a first axial end and a second axial end opposing the first axial end, the first axial end and the second axial end each having an opening therethrough into an interior of the hollow core stator, the opening into the interior of the hollow core stator extending from the first axial end to the second axial end;

wherein a portion of the housing including blades disposed on the common hollow shaft nearest to the inlet and the outlet and a portion of the magnetic drive including the outer magnet array extends toward the first axial end and the second axial end of the hollow core stator;

wherein the magnetic drive is configured to transmit torque to the at least one impeller at an outside of the at least one impeller, rather than through the common hollow shaft;

wherein the magnetic drive is configured to transmit torque to through the at least one impeller at the location radially spaced from the central axis of the at least one impeller, wherein the magnetic drive is configured to transmit torque to all of the plurality of blades extending radially outward from the common hollow shaft including the blades disposed on the common hollow shaft nearest to the inlet and the outlet of the housing;

wherein the outer magnet array forms an outer casing of the pump, which is directly received within the hollow core stator of the electric motor, the outer magnet array is cylindrical in shape and has an inside diameter that corresponds to an outer diameter of the housing;

wherein the common hollow shaft of the at least one impeller is hollow such that no component of the pump intersects the central axis about which the at least one impeller rotates; and wherein the at least one impeller includes a first impeller having a first rotatable, hollow shaft portion from which a plurality of blades extend and a second impeller having a second rotatable, hollow shaft portion from which a plurality of blades extend, the first and second hollow shaft portions together forming the common hollow shaft, the second impeller taking up a greater portion of a circumference of the common hollow shaft than the first impeller.

17. The pump of claim 16, wherein the portion of the housing that extends out beyond the periphery of both the first axial end and the second axial end of the hollow core stator includes the inlet and the outlet, wherein the inlet of the housing extends out beyond the periphery of the first axial end of the hollow core stator and the outlet of the housing extends out beyond the periphery of the second axial end of the hollow core stator.

* * * * *